United States Patent

Druet et al.

[11] Patent Number: 6,149,312
[45] Date of Patent: Nov. 21, 2000

[54] ROLLER BEARING

[75] Inventors: Clair Druet, Drummettaz Clarafond, France; Vello Klaassen, Mölndal; Filip Rosengren, Göteborg, both of Sweden

[73] Assignee: SKF Nova AB, Gothenburg, Sweden

[21] Appl. No.: 09/218,070

[22] Filed: Dec. 22, 1998

[51] Int. Cl.$^7$ ........................................ F16C 19/34
[52] U.S. Cl. .................. 384/565; 384/550; 384/568
[58] Field of Search ..................... 384/565, 568, 384/550

[56] References Cited

U.S. PATENT DOCUMENTS

| 452,373 | 5/1891 | Hardy | 384/565 |
|---|---|---|---|
| 2,251,555 | 8/1941 | Schermer | 384/565 |
| 2,266,888 | 12/1941 | McCurdy et al. | 384/550 |
| 3,281,191 | 10/1966 | Benson . | |
| 3,734,584 | 5/1973 | Studer | 384/565 |
| 3,934,957 | 1/1976 | Derner . | |
| 4,040,689 | 8/1977 | Stanley | 384/550 |
| 4,780,003 | 10/1988 | Bauer et al. . | |
| 5,836,701 | 11/1998 | Vranish | 384/565 |
| 6,015,238 | 1/2000 | Zernickel | 384/565 |

FOREIGN PATENT DOCUMENTS

| 879067 | 2/1943 | France . |
|---|---|---|
| 537156 | 10/1931 | Germany . |
| 19734134 | 2/1999 | Germany . |
| 48-57035 | 8/1973 | Japan . |
| 51-123453 | 10/1976 | Japan . |
| 1 319 591 | 6/1973 | United Kingdom . |

*Primary Examiner*—Thomas R. Hannon
*Attorney, Agent, or Firm*—Burns, Doane, Swecker & Mathis, L.L.P.

[57] ABSTRACT

A roller bearing comprising an inner and an outer ring in concentrical arrangement, a series of roller elements being arranged in the space between said rings and being in contact with raceways provided in said rings. The bearing is characterized in that said raceways are provided with parallel grooves, each one of said grooves being arranged in the plane of rotation of said rings and extending along the entire envelope surface, and in mutual correspondence to said inner and outer rings and being arranged for mating interaction with protruding flanges of said roller elements corresponding to said grooves, said protruding flanges extending along the entire envelope surface of said roller elements.

14 Claims, 1 Drawing Sheet

ROLLER BEARING

This application corresponds to and claims priority under 35 U.S.C. § 119 with respect to Swedish Application No. 9704865-6 filed on Dec. 22, 1997, the entire content of which is incorporated herein by reference.

FIELD OF THE INVENTION

The present invention generally relates to roller bearings. More particularly, the present invention pertains to a roller bearing having inner and outer rings arranged in a concentric manner, with a series of roller elements arranged in the space between the rings in contact with raceways provided in the rings.

BACKGROUND OF THE INVENTION

It is necessary in certain ball bearing applications to support a high thrust load in combination with a radial load under the restrictions of limited bearing section height. A previously known way of addressing this situation involves using a needle roller in combination with a ball bearing. In these arrangements, the needle roller bearing is used to support the main part of the radial load and the ball bearing is used to support the thrust load. However, one drawback associated with this arrangement is that it can be quite expensive. In addition, such an arrangement can force the designer to limit the thrust load and/or increase the section height of the bearing in order to increase the load carrying capacity of the ball bearing.

U.S. Pat. No. 2,251,555 discloses a frictionless roller bearing that includes a structure embodying a roller bearing having an elongated substantially cylindrical body in which are formed a plurality of axially spaced and circumferentially extending V-shaped grooves. The periphery of the body between the grooves possesses a contour curving circumferentially and axially of the body, and with the body at its opposite ends terminating at the base of a groove. A retaining ring engages, adjacent the inner edge of one of its faces, an end face of the rollers adjacent the perimeter thereof. Unfortunately, this roller bearing is not intended to support axial loads. Indeed, constructing the roller bearing to support axial loads is not an objective sought to be achieved by the disclosed bearing. Rather, the primary focus of the disclosure in U.S. Pat. No. 2,251,555 is to decrease the area of frictional contact, thereby resulting in decreased friction.

U.S. Pat. No. 2,266,888 discloses an antifriction bearing that includes a journal having its bearing area provided throughout the length thereof with circumferential corrugations, and an opposing box having its bearing surface similarly provided throughout its length with corrugations matching those of the journal. A series of rollers are located in spaced relation between the two bearing surfaces provided over their bearing lengths with circumferential corrugations similar to those on the bearing surfaces of the journal and box, and interfitting in load carrying relation therewith. The circumferential corrugations on the rollers and on the journal and the box have their side surfaces of convex contour and provide a restricted area of contact between opposing corrugations at points intermediate the tops and bases of the corrugations. As a mechanism for maintaining the rollers in spaced relation, a gear is provided on each end of the rollers and gears are provided on the journal and box, respectively, at each end thereof with which the gears on the rollers engage. As in the case of the bearing described above, the bearing described in U.S. Pat. No. 2,266,888 is not intended or designed to support axial loads. The primary object of the bearing construction described in U.S. Pat. No. 2,266,888 is to provide a bearing in which frictional resistance is reduced.

SUMMARY OF THE INVENTION

In light of the foregoing, the present invention provides a roller bearing that includes an inner ring and an outer ring arranged concentrically with one another with a space being provided between the inner and outer rings, and a series of roller elements arranged in the space between the inner and outer rings. The raceways of the inner and outer rings are provided with parallel grooves, with each one of the grooves being arranged in the plane of rotation of the rings and extending along the entire envelope surface of the rings. The grooves are in mutual correspondence to the inner and outer rings and are arranged for mating interaction with protruding flanges of the roller elements corresponding to the grooves. The protruding flanges extend along the entire envelope surface of the roller elements.

BRIEF DESCRIPTION OF THE DRAWING FIGURES

Additional features and characteristics of the present invention will become more apparent from the following detailed description considered with reference to the accompanying drawing figures in which:

FIG. 1 is a cross-sectional view of a preferred embodiment of a roller bearing according to the present invention; and FIG. 2 is a schematic illustration of a washer-like element that can be used in conjunction with the inner and outer rings and/or the flanges of the roller elements to produce an internal preload in the bearing.

DETAILED DESCRIPTION OF A PREFERRED EMBODIMENT

Figure 1:
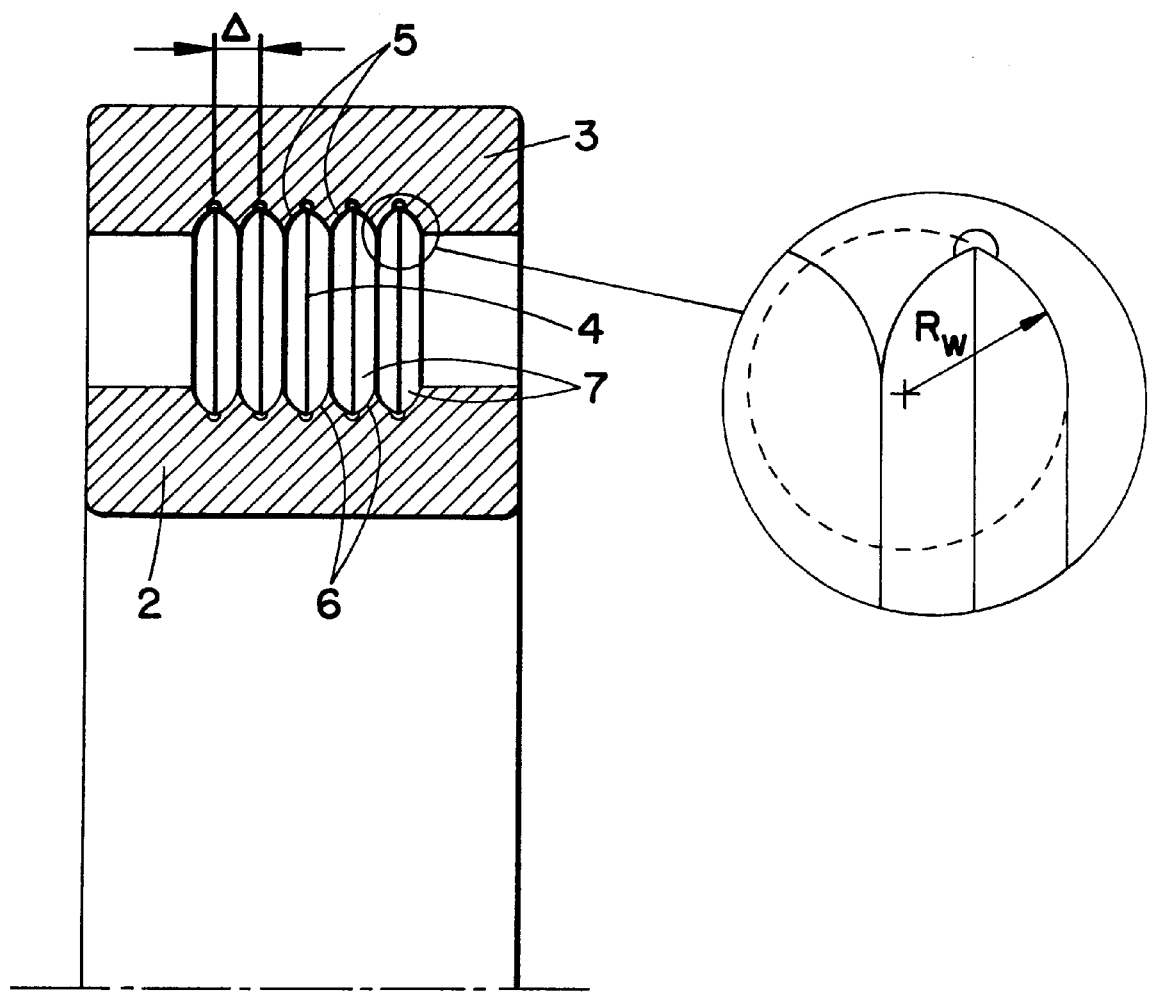

FIG. 1 illustrates a part of a roller bearing 1 according to the present invention. The bearing 1 includes an inner ring 2 and an outer ring 3 that are arranged concentrically with respect to one another with a space being provided between the rings 1, 2. A series of roller elements 4, only one of which is shown in FIG. 1, is arranged between the inner and outer rings 1, 2. The roller elements 4 are arranged in the space between the inner and outer rings 2, 3 and are in contact with raceways provided in the inner and outer rings 2, 3. The raceways are provided with a plurality of parallel grooves 5, 6. Each one of the grooves 5, 6 is arranged in the plane of rotation of the rings 2, 3 and extends along the entire envelope or inner surface of the rings 1, 2. The grooves 5, 6 are in mutual correspondence to the inner and outer rings 2, 3 and are arranged for mating interaction with protruding flanges 7 of the roller elements 4 that correspond to the grooves 5, 6. The protruding flanges 7 extend along the entire envelope or outer surface of the roller elements 4. That is, each of the protruding flanges 7 extends along the entire circumferential of the roller elements.

Figure 2:

According to an alternative embodiment, there is a slightly different distance Δ between two arbitrary adjacently arranged grooves 5, 6 of the inner and outer rings 2, 3 and between two adjacently arranged corresponding protruding flanges 7 of the roller elements 4 for causing a certain internal preload in the bearing 1. The function associated with this preload is to reduce axial and radial play. One way of accomplishing or achieving the distance Δ is to arrange at least one washer-like element positioned in the plane of rotation in one or both of the rings 2, 3. The number and thickness of the washer-like elements may vary depending on the desired preload or the desired application. Another way of accomplishing or achieving the distance Δ is to arrange at least one washer-like element to at least one of the roller elements 4. A schematic illustration of a washer-like element that can be used in the aforementioned ways to produce the internal preload is schematically shown in FIG. 2, it being understood that the FIG. 2 illustration is merely a schematic depiction and the element would be appropriately configured for use in the aforementioned ways to achieve the previously described preload.

Also, the shapes of the grooves 5, 6 of the inner and outer rings 2, 3 are arranged to be determined by predetermined radii $R_w$ as shown in the detail of FIG. 1. The shapes are arranged to correspond to the forms of the protruding flanges 7 of the roller elements 4. The shapes of the corresponding protruding flanges 7 of at least one roller element 4 are also arranged to be determined by the predetermined radii $R_w$ as also shown by the detail in FIG. 1. It should be noted that the shapes of the flanges 7 do not necessarily have to be of the same magnitude. That is, a flange provided on one end of a roller element 4 does not have to present the same shape as a flange arranged on the middle of the roller element 4. Of course, this requires that the corresponding grooves have to be adjusted accordingly. However, for practical purposes, all predetermined radii are normally arranged to be of equal magnitude.

Another alternative envisioned by the present invention involves a cage being arranged to guide and separate the roller elements 4 and to provide for sufficient lubrication. Grease can preferably be provided on the cage.

The principles, preferred embodiments and mode of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A roller bearing comprising an inner ring and an outer ring arranged concentrically with one another with a space being provided between the inner and outer rings, a series of roller elements arranged in the space between said inner and outer rings, said roller elements possessing protruding annular flanges that extend along an entire circumferential extent of the roller elements, said rollers being in contact with raceways provided in said inner and outer rings, said raceways being provided with parallel grooves each arranged in a plane of rotation of said inner and outer rings, each groove extending along an entirety of a surface of the inner and outer rings and in mutual correspondence to said inner and outer rings for mating interaction with the protruding flanges of said roller elements, and wherein a different distance is provided between two arbitrary, adjacently arranged grooves of said inner and outer rings, and between two adjacently arranged corresponding protruding flanges of said roller elements to cause an internal preload in said bearing.

2. The roller bearing according to claim 1, wherein said distance is arranged to be accomplished by at least one washer element arranged in the plane of rotation in at least one of said inner and outer rings.

3. The roller bearing according to claim 1, wherein said distance is produced by at least one washer element arranged on at least one of said roller elements.

4. The roller bearing according to claim 1, wherein said grooves of said inner and outer rings are arranged to be determined by predetermined radii.

5. The roller bearing according to claim 4, wherein the predetermined radii of all of the grooves of said inner and outer rings are of equal magnitude.

6. The roller bearing according to claim 1, said protruding flanges of at least one roller element are arranged to be determined by predetermined radii.

7. The roller bearing according to claim 6, wherein the predetermined radii of all of the roller elements are of equal magnitude.

8. A roller bearing comprising:

an inner ring;

an outer ring arranged concentrically with the inner ring;

a space provided between the inner and outer rings;

at least one roller element arranged in the space between said inner and outer rings, said roller element having a circumference and possessing a plurality of outwardly protruding flanges that each extend around the entirety of the circumference of the roller element; and said inner and outer rings being provided with a plurality of parallel grooves each arranged in a plane of rotation of said inner and outer rings, said grooves extending along the entirety of a surface of the inner and outer rings and matingly interacting with the protruding flanges of said roller element, and wherein a different distance is provided between two arbitrary, adjacently arranged grooves of said inner and outer rings and between two adjacently arranged corresponding protruding flanges of said roller element to cause an internal preload in said bearing.

9. The roller bearing according to claim 8, wherein said different distance is provided by at least one washer element adapted to be arranged in the plane of rotation in at least one of said inner and outer rings.

10. The roller bearing according to claim 8, wherein said different distance is produced by at least one washer element adapted to be arranged on said roller element.

11. The roller bearing according to claim 8, wherein said grooves of said inner and outer rings are arranged to be determined by predetermined radii.

12. The roller bearing according to claim 11, wherein the predetermined radii of all of the grooves of said inner and outer rings are of equal magnitude.

13. The roller bearing according to claim 8, wherein said protruding flanges of the roller element are arranged to be determined by predetermined radii.

14. The roller bearing according to claim 13, wherein the predetermined radii of the flanges of the roller element are of equal magnitude.

* * * * *